March 5, 1968  J. H. WHITTLESEY  3,371,589
BIPOD CAMERA SUPPORT
Filed June 21, 1965  4 Sheets-Sheet 2
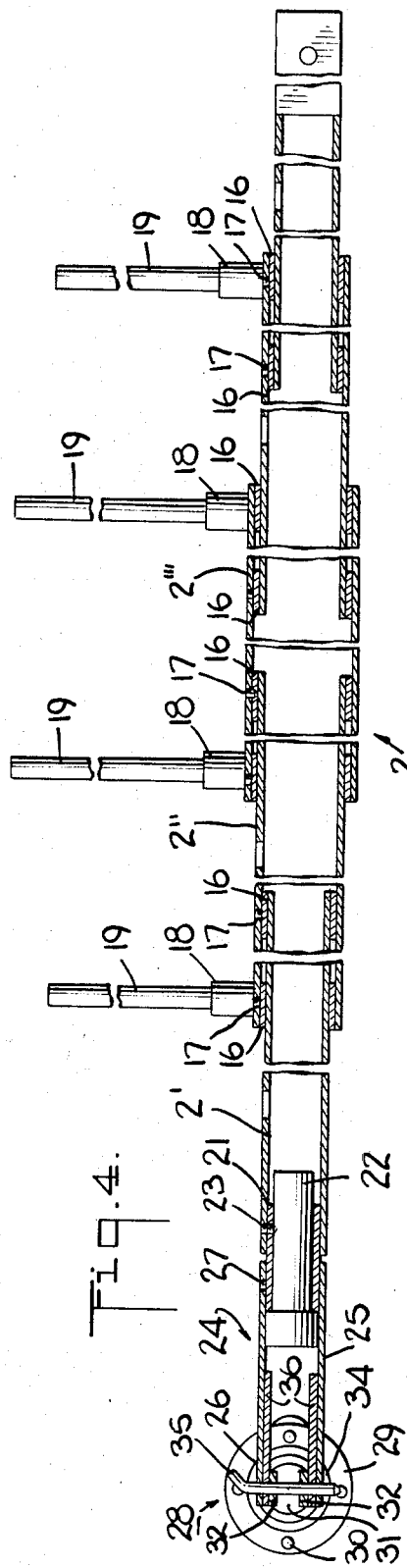
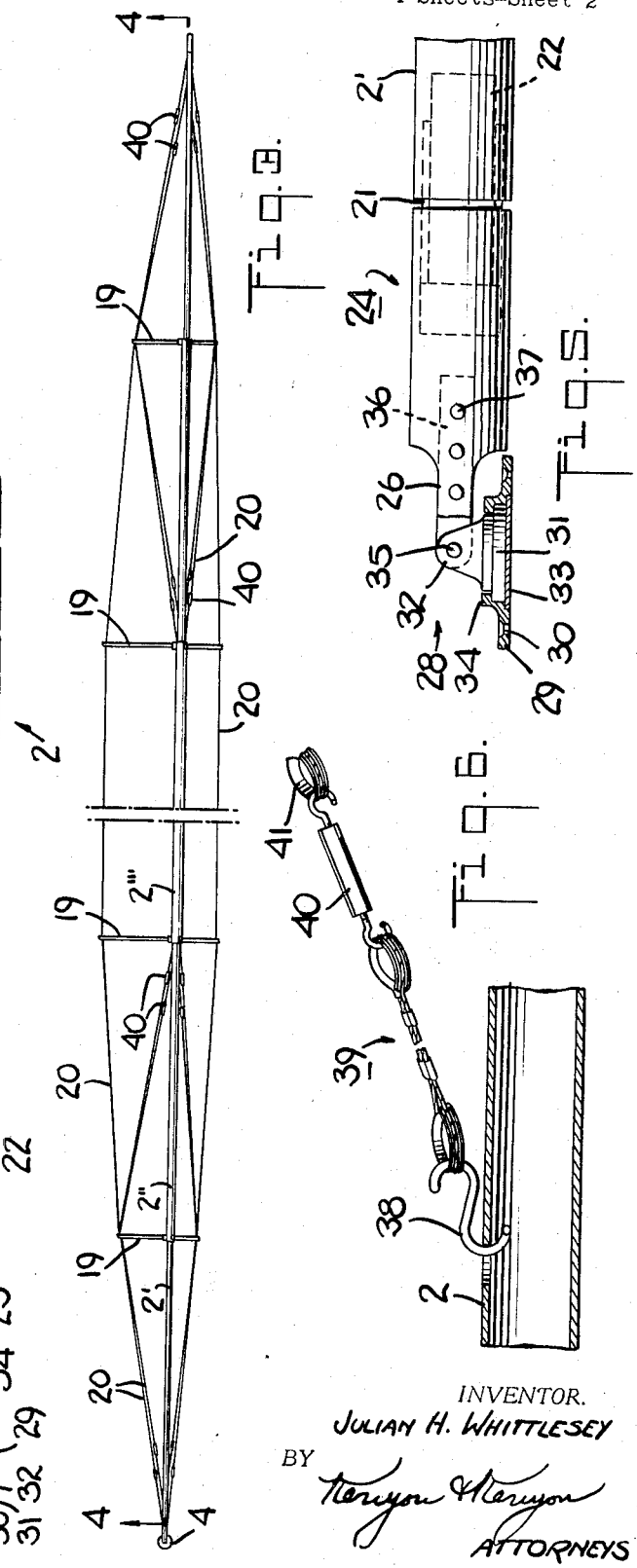
INVENTOR.
JULIAN H. WHITTLESEY
BY
Kenyon & Kenyon
ATTORNEYS March 5, 1968

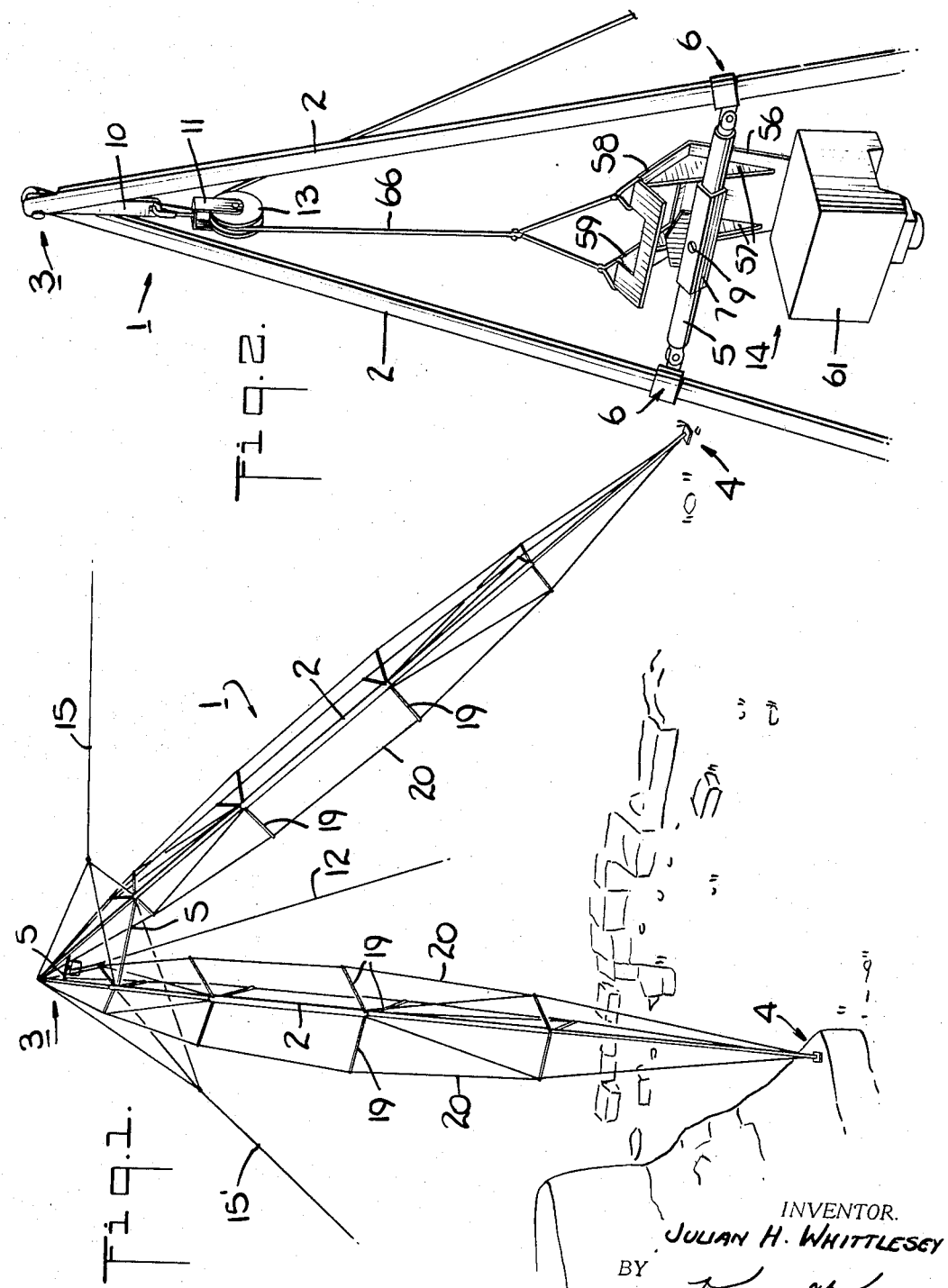

J. H. WHITTLESEY 3,371,589

BIPOD CAMERA SUPPORT

Filed June 21, 1965

INVENTOR.
JULIAN H. WHITTLESEY
BY
Kenyon & Kenyon
ATTORNEYS

March 5, 1968
J. H. WHITTLESEY
3,371,589
BIPOD CAMERA SUPPORT
Filed June 21, 1965
4 Sheets-Sheet 4
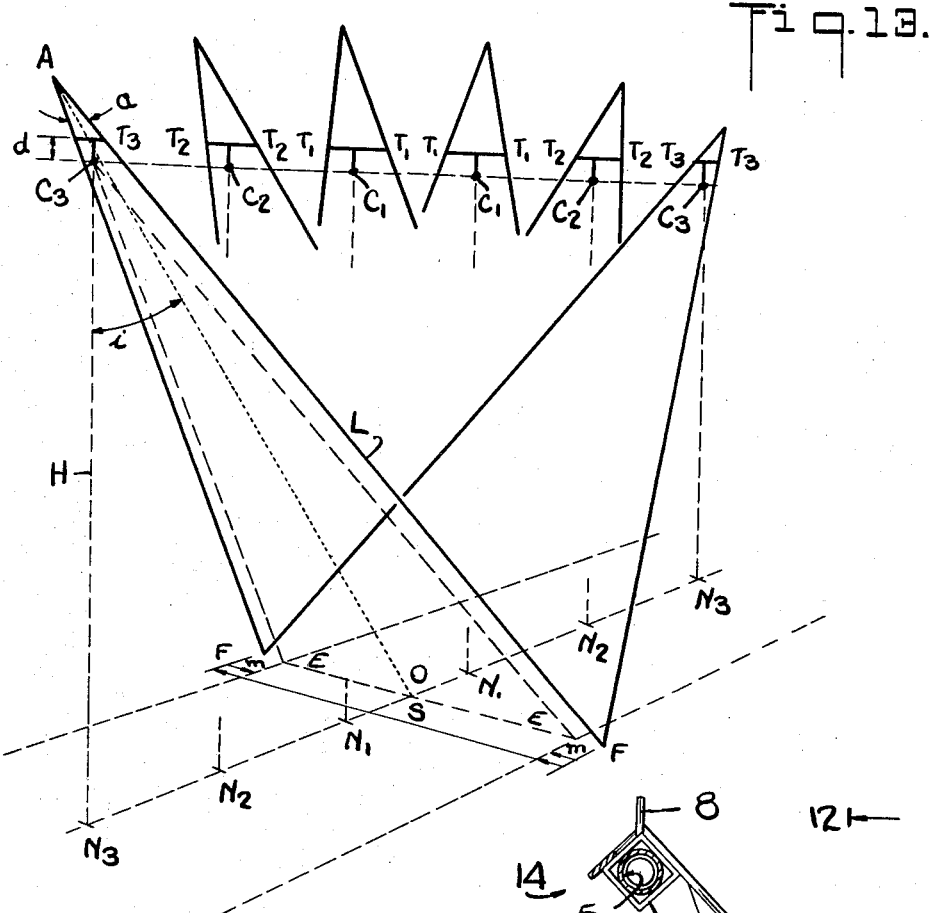
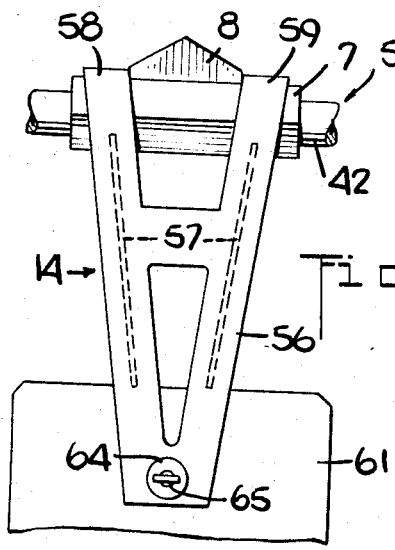
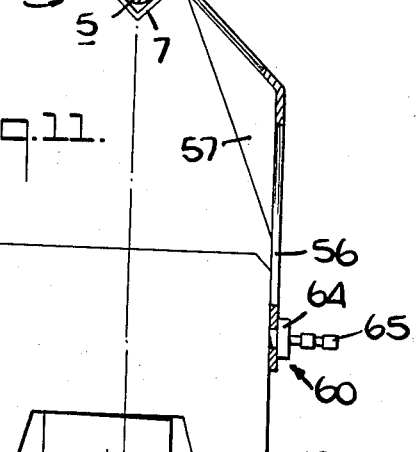
INVENTOR.
JULIAN H. WHITTLESEY
BY
*Kenyon & Kenyon*
ATTORNEYS

United States Patent Office 3,371,589
Patented Mar. 5, 1968

3,371,589
BIPOD CAMERA SUPPORT
Julian Hill Whittlesey, 122 E. 65th St.,
New York, N.Y. 10021
Filed June 21, 1965, Ser. No. 465,505
8 Claims. (Cl. 95—86)

ABSTRACT OF THE DISCLOSURE

The camera support consists of an A-shaped frame mounted for pivotal movement at the base of the legs. The camera is mounted on a pulley system from the apex of the A-shaped frame. Pairs of photographs are obtained by pivoting the frame between two spaced points of equal distance from a vertical plane through the base of the frame.

---

This invention relates to a bipod camera support. More particularly, this invention relates to a bipod camera support for taking a series of photographs for close-up terrestrial photogrammetry.

In the past it has been a problem to take close-up photographs for terrestrial photogrammetry purposes. It is known that photographs can be taken at altitudes above a desired plane in order to obtain the necessary photographs of a subject in that plane. Such photographs can be taken from airplanes and balloons in a conventional manner; however, since the precise elevation of such means above the photographed subject cannot be precisely determined, the mathematical controls become a problem in the interpretation of the obtained photographs. In order to provide a more precise mathematical control to the obtained photographs, a number of ground-based assemblies have been utilized. These include cranes, booms, and towers; however, these have been found to be expensive, cumbersome and difficult to maneuver. Further, the use of these devices are unwelcome on an archaeological site and other such sensitive sites.

This invention overcomes the problems of the prior art by providing a camera support which is ground-based, simple, light and easily maneuverable. Further, the invention provides a camera support which enables photographs to be taken wherein the mathematical controls are precise; thus, negating any reliance upon a high order of stereoscopic measuring instruments or highly specialized technicians. The invention also provides a camera support which enables stereo photographs to be taken from which field results may be easily obtained.

Generally, this invention comprises a bipod support for a camera which is universally mounted at its pod supports for rotation thereto. The bipod support comprises a pair of pods or legs, which are joined together at one end and spaced apart the other end to form an A-shaped frame. An adjustable length cross bar is supported on each leg at a precise point below the apex of the frame. Each leg is mounted on a universal joint support which is capable of being easily transported from position to position.

The cross bar of the A-frame supports a camera holding frame thereon in a depending orientation. Such an orientation allows a camera to be perfectly plumbed, or aligned, with respect to the ground. The camera holding frame is positioned onto the cross bar by means of a suitable swivel type pulley device which is secured to the apex of the A-frame. A camera can thus be easily raised and lowered into proper position.

The bipod camera support is utilized by positioning it astride the area to be photographed. A suitable camera is mounted on the cross bar and the first of a pair of stereo photographs is taken. Next, the bipod camera support is swung about its supports into a second position spaced from the first position wherein the camera is at the same elevation as it was on the first position and the second of the pair of stereo photographs is taken. If more than one pair of stereo photographs is desired, the cross bar is lowered or raised with respect to the apex of the bipod support and the bipod support is swung to and fro to the appropriate positions to position the camera in the proper elevation plane. Accordingly, any number of photographs can be taken from spaced points in the same horizontal plane.

Since the longitudinal and transverse axes of the bipod camera support are known and can be simply laid out by means of a suitable wire or string, the camera which is mounted on the cross bar can be precisely positioned along the longitudinal axis of the bipod camera support by being plumbed thereto at an exact known position from the vertical plane passing through the bipod leg supports. After a photograph is taken, the camera can be lowered and reset. However, the bipod support is then swung to the other side of the vertical plane passing through its supports and the camera is re-positioned on the cross bar at a position on the longitudinal axis of the bipod support which is exactly the same distance from the vertical plane as was the first known position. Thus, by simple computations, all distances and focal lengths being known, the scale and coverage of the stereo photographs can be determined.

Accordingly, it is an object of this invention to provide a camera support for taking close-up terrestrial photographs.

It is another object of this invention to provide a bipod camera support which is tiltable along a longitudinal axis.

It is another object of this invention to provide a bipod camera support which is simple, light and economical.

It is another object of this invention to provide a method of taking stereo photographs for close-up terrestrial photogrammetry.

It is another object of this invention to provide a bipod camera support for taking close-up terrestrial photographs in an oblique plane.

These and other objects and advantages of this invention will become more apparent from the following detailed description and appended claims taken in conjunction with the accompanying drawings in which:

FIG. 1 illustrates a perspective view of the bipod camera support in situ;

FIG. 2 illustrates a perspective view of a camera holding frame about to be put in place on the bipod camera support;

FIG. 3 illustrates a view of one leg of the bipod camera support;

FIG. 4 illustrates a cross-sectional view taken at line 4—4 of FIG. 3;

FIG. 5 illustrates a view of the pod support and connection of a leg of the bipod camera support;

FIG. 6 illustrates a part sectional view of a guy connection;

FIG. 11 illustrates a view of the camera holding frame;

FIG. 12 illustrates a view taken at line 12—12 of FIG. 11; and

FIG. 13 illustrates the operation of the bipod camera support.

Figure 8:
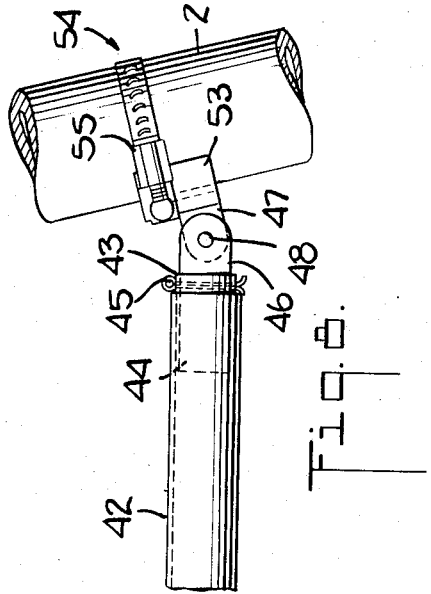
FIG. 8 illustrates a modification of FIG. 7.

Referring to FIGS. 1 and 2, the bipod camera support 1 comprises a pair of legs 2 which are preferably tubular in shape and which are made of a plurality of coaxial concentric tubular segments 2′, 2″, 2‴ so as to be of adjustable length. The legs 2 are connected together in pivotal relationship at one end thereof by a suitable bolt, washer and wing nut assembly 3 while the other ends are mounted in suitable spaced universal supports 4. An adjustable cross bar 5 is secured at each of its ends to a leg 2 by a suitable connector 6 to form an A-shaped frame. Due to its adjustability, the cross bar 5 can be moved within its limits longitudinally of the legs 2 to any desired intermediate point in the frame. A plurality of cross bars 5 may be used where the height of the camera support dictates such, each cross bar 5 being adjustable and utilized within a particular zone. In any event each cross bar 5 is provided with a camera stabilizer device 7 which consists of a slidable square-shaped tube and an upstanding flange 8. The stabilizer 7 is suitably provided with a locking means, such as, a threaded locking screw 9, to secure it to the cross bar 5.

A suitable strap hanger 10 depends from the bolt of the assembly 3 between the pair of legs 2 and supports snap swivel type pulley 11 therefrom. A suitable cable means 12 is passed over the pulley wheel 13 of the pulley 11 and is connected at one end to a camera holding frame 14 which is more particularly described hereinafter.

As shown in FIG. 1, suitable bridles 15, 15′ are attached at three points to the bipod camera support 1 on opposite sides thereof. The bridles may be made of any suitable material, for example, nylon cord. Further, the bridles may be attached to the legs 2 of the support frame 1 in any suitable manner, for example, by tying or by a snap hook fit. The bridles permit the support 1 to be moved about its supports 4 by proper pulling or restraining of a respective bridle. By way of example, one bridle may be connected to a suitable winch which is sufficiently spaced from the camera support so as not to interfere in the operation thereof and by actuating the winch while the support frame 1 is inclined away from the winch, the support frame 1 can be pivoted about its supports 4 towards the winch. The opposite bridle 15′ will come into use as a restraining medium as the support frame 1 passes through its vertical position on its way toward the winch. This opposite bridle 15′ may be suitably weighted down at its free end so as to oppose the addition of the support frame 1 or held manually. It is noted that the support frame 1 should be lifted by any suitable means from a horizontal position to a slightly inclined position so that the winch can be more easily actuated.

Referring next to FIGS. 3, 4 and 5, each leg 2 is comprised of three tubular segments 2′, 2″, 2‴ which are slidably supported on each other by means of bushings 16. The bushings 16 are provided in pairs within the bores and at each end of the outermost segments 2″, 2‴. The bushings 16 which may be of bronze or other bearing material are fixed within the segments 2′, 2″, 2‴ by suitable locking set screws 17 which pass through the segments into the bushings 16. Each of the outermost segments 2″, 2‴ is also provided with a series of equally spaced socket tubes 18 at each end thereof, each of which receives a spreader arm 19 therein. As shown in FIG. 1, each series is composed of three sockets 18 and spreader arms 19. Each spreader arm 19 is provided at its outer end with a bifurcated slot for guidance of a suitable guy cable 20 therein.

The innermost segment 2′ is provided at the end adjacent the universal support 4 with a bushing 21 similar to the bushings 16 and with a headed bushing pin 22 within the bushing 21. The bushing 21 and pin 22 are secured within the segment 2′ by a threaded set screw 23 which passes through the segment 2′ and bushing 21 into the pin 22. The bushing 21 and pin 22 project out of the segment 2′ into the turning foot assembly 24 of the universal support 4.

The turning foot assembly 24 comprises a sleeve 25 having a pair of leg portions 26 thereon. The sleeve 25 is mounted on the bushing 21 and pin 22 in fixed relation by a suitable set screw 27 which passes through the sleeve 25 into the bushing 21. The lug portions 26 of the assembly 24 are mounted in a suitable manner on a universal joint which may be of any known type; however, for purposes of illustration a swivel type joint 28 is shown. The swivel joint 28 comprises a brass swivel plate 29 which has a plurality of apertures 30 therein for mounting purposes, a rotating section 31 which has a pair of upstanding lugs 32 thereon, and a brass plate 33 fixedly connected to the base of the swivel plate 29 to enclose the rotating section 31 therein. The swivel plate 29 is suitably provided with shoulders 34 so as to retain the swivel plate 29 therein while permitting rotation thereof.

The lug portions 26 of the turning foot assembly 24 and the lugs 32 of the swivel joint are provided with apertures which, when aligned, permit a setting pin 35 to pass therethrough to secure the respective lugs in pivotal relationship. In order to provide a suitable bearing surface between the respective lugs, a pair of brass bearing plates 36 are secured to the inside of the lug portions 26 by suitable locking means such as screws 37. Thus the universal mounts 4 permit the support frame 1 to pivot about the axis of the mounts 4 with complete freedom.

As shown in FIG. 4, the end of each leg 2 adjacent the apex of the support frame 1 is suitably slotted to provide a proper fit with the other leg 2.

As shown in FIG. 5, a plurality of guy cables 20 are secured at various points and in various manners to the leg 2 of the support frame 1. These guy cables 20 function as stiffeners for the legs 2 and may be secured thereto in any suitable manner; however, for purposes of illustration the guy cables 20 are secured by a hook and turnbuckle means.

Referring to FIG. 6, a leg 2 is slotted to receive a hook 38 which is carried by a thimble means 39 of known construction. An appropriate turnbuckle 40 is carried at the other end of the thimble means 39 and is connected to a thimble 41 which is carried by a guy cable 20. This type of connection is utilized for the remainder of the guy cable connections to the legs 2.

Figure 7:
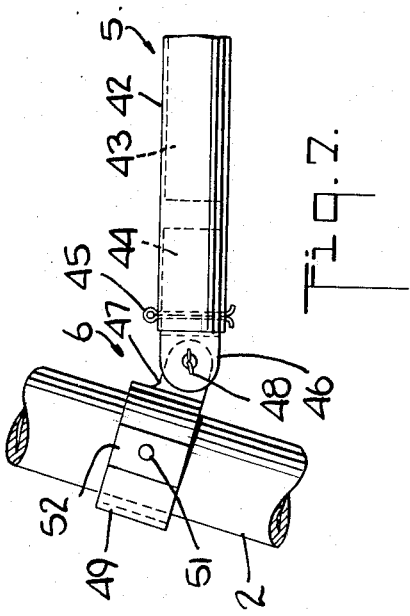
FIG. 7 illustrates a view of the connection of an adjustable camera support tube to a leg of the bipod camera support.
Figure 9:
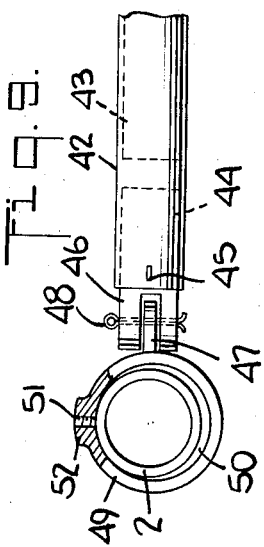
FIG. 9 illustrates a plan view of FIG. 7.

Referring to FIGS. 7 and 9, the adjustable cross bar 5, of which there may be a plurality is composed of a pair of telescoping tubes 42, 43 each mounted to an end on a suitable cylindrical knuckle 44 in fixed relation by suitable means, such as a cotter pin 45. Each knuckle 44 is formed with a pair of projecting lugs 46, each having an aperture therethrough. The lugs 46 are disposed on opposite sides of an apertured flange 47 on the connector 6 and a suitable means, such as a cotter pin 48, passes through the lugs 46 and flange 47 when in alignment to pivotally secure them together.

The connector 6 in addition to having the flange 47 thereon is composed of a cylindrical sleeve 49 which has an arcuate segment 50 welded therein and a locking screw 51 opposite the arcuate segment 50, as shown in FIG. 9, the sleeve 49 is larger than the tubular leg 2 so as to be adapted to different diameter tubes. When in proper position on a leg 2, the locking screw 51 is threaded into the sleeve 49 to clamp the connector 6 to the leg 2. A suitable pressure pad 52 may also be provided on the sleeve 49 for the locking screw 51 to provide more rigidity.

Figure 10:
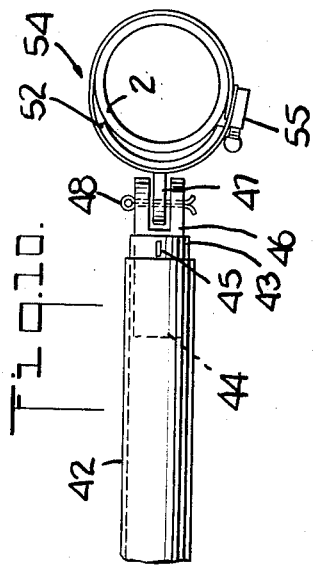
FIG. 10 illustrates a plan of view of FIG. 8.

Referring to FIGS. 8 and 10, the connection between the cross bar 5 and the connector 6 is similar to that described in FIGS. 7 and 9 and like reference characters have been used; however, the connector 6′, in addition to the flange 47, is composed of an arcuate segment 53 which is clamped against the leg 2 by means of a conventional hose clamp 54. Thus the connector 6′ can be adapted for many sized legs by proper manipulation of the adjustment means 55 of the clamp 54.

In either of the above modifications the telescoping tubes 42, 43 have a wide range of sizes to which they can be extended.

Referring to FIGS. 11 and 12, the camera holding frame 14 is composed of a bracket 56 of inverted A-shape which is provided with a pair of stiffener plates 57 on the inside of the legs 58, 59 thereof. The lower end of the bracket 56 is provided with a suitable screw device 60 for securing a camera 61 thereto and the upper end of the bracket legs 58, 59 are flanged over to provide a right-angle bend for seating on the camera stabilizer device 7. As shown in FIG. 12, the legs 58, 59 of the bracket 56 straddle the upstanding flange 8 of the stabilizer device 7.

The screw device 60 may be of any construction which provides for slight adjustment of the camera 61 with respect to the bracket 56 so that the balance axis 62 of the bracket and camera is parallel with the optical axis 63 of camera 61. For purposes of illustration, the screw device 60 comprises an internally threaded bushing 64 fixed in the bracket 56 and an adjustment screw 65 which threads through the bushing 64 into the camera 61. It is to be noted that many type cameras may be used with the bipod camera support 1 hence, any number of suitable camera brackets or screw devices may be used.

In operation, the bipod camera universal supports 4 are initially positioned astride the area to be photographed. The bipod camera support legs 2 which can be of any desired length are in a substantially horizontal position, supported about a foot from the ground. The bridle 15 which is attached to winch or similar means is activated so as to pivot the bipod camera support 1 about the universal supports 4 towards a vertical position. When the camera support 1 comes into the first desired inclined position which is determined in any suitable manner, such as by a plumb bob, the pulling force on the bridle 15 is stopped. With the camera support in its desired inclined position, the camera holding frame 14 is lifted by means of the pulley 11 and a suitable cable 66 from the ground to the desired cross bar 5. Because of the right angle bend in the camera bracket 56, the frame 14 is passed over the stabilizer device 7 on the cross bar 5 and is subsequently lowered onto the stabilizer device 7 so that the legs 58, 59 of the bracket 57 straddled the upstanding flange 8. A photograph is then taken of the area below the camera by means of a suitable tripping device (not shown). The bipod camera support 1 is then swung over to the other side of its vertical position to a second inclined position which is of equal distance from the vertical position as the first position. The camera is then reset either manually by being lowered to ground level where it is reset and raised back into position or automatically in place. When in position the second photograph is taken. Thus a pair of stereo photographs is obtained to be utilized in the usual manner. If more than one pair of stereo photographs are desired, the above operation is repeated in sequence.

Referring finally to FIG. 13, the bipod camera support 1 provides particular mathematical controls in obtaining stereo photographs. As shown, the legs L of the bipod support join at apex A and form an angle $a$ with each other and an angle $i$ with the vertical plane. The universal supports at points F are spaced apart a distance S. The cross bar is positioned at points T on the legs of the support and the camera is supported therefrom at points C a distance $d$ from the crossbar and a distance H from the ground. The camera is positioned sequentially over stations N to take photographs of the surrounding area. The photographs which are taken are of a length to cover the distance S less an amount $2m$ which is sufficient to avoid having the guy wires of the legs in the photographs (i.e. EOE). The stations N are selected a distance $b$ apart so as to have the desired overlap in the stereo photographs. With these parameters and a known camera, tables can be drawn up for field computation.

The bipod camera support may be used most efficiently if there is precalculation of the optimum set-up for a given mission. Any mission is likely to involve certain a priori requirements, such as selection of focal length appropriate to the projection required, shape and size of object area; type of work, whether spot work or repetitive measurement or observation on one location; mapping scale if any; speed of work, frequency of observation etc. The considerations in arriving at the optimum set-up for the bipod for a given mission are similar to those in determining the optimum flight program for an aerial survey mission. Tables facilitating the determinations are advisable in order to save time and avoid inefficient set-ups.

From the above, it is possible to set up the following formulae for a 2¼ x 3¼ Linhof camera for a lateral format:

(1)  $$(C_3N_3)^2 = (C_3E)^2 - (OE)^2 - (N_3O)^2$$

$$H^2 = (C_3E)^2 - \left(\frac{1 \times H}{2f}\right)^2 - \left[(b)\left(\frac{N}{2} - \frac{1}{2}\right)\right]^2$$

where $C_3E$ represents the camera position and $b$ represents the camera separation.

For the above Linhof camera, a camera support bracket and photograph sequance are used which reduces the formula to $$H^2 = (L-75)^2 - \left(\frac{1 \times H}{2f}\right)^2 - \left[\frac{0.4w \times H}{f} \times 2.5\right]^2$$

(2)  $$S = OE + 2m$$
$$= \left(\frac{1 \times H}{2f}\right) + 2m$$

(3)  $$b = \frac{0.4w \times H}{f}$$

for a longitudinal format:

(4)
$$H^2 = (L-75)^2 - \left(\frac{wH}{2f}\right)^2 - \left[\left(\frac{0.41 \times H}{f}\right)\left(\frac{N}{2} - \frac{1}{2}\right)\right]^2$$

where $l$ = length of film format
$w$ = width of film format
$f$ = focal length

The coverage of the photographs for a lateral format is easily obtained from the formula;

(5) $\frac{1}{f} \times H$ by $0.6 \frac{w}{f} \times H$ for 2 photo sequence $\frac{1}{f} \times H$ by $1.4 \frac{w}{f} \times H$ for 4 photo sequence $\frac{1}{f} \times H$ by $2.2 \frac{w}{f} \times H$ for 6 photo sequence $\frac{1}{f} \times H$ by $3.0 \frac{w}{f} \times H$ for 8 photo sequence for a longitudinal format (6) $\frac{w}{f} \times H$ by $0.6 \frac{1}{f} \times H$ for 2 photo sequence $\frac{w}{f} \times H$ by $1.4 \frac{1}{f} \times H$ for 4 photo sequence $\frac{w}{f} \times H$ by $2.2 \frac{1}{f} \times H$ for 6 photo sequence $\frac{w}{f} \times H$ by $3.0 \frac{1}{f} \times H$ for 8 photo sequence The scale of the photographs is (7)   IMAGE/OBJECT = $f/H$ Many tables may be set up for determination of various parameters, e.g. the size of the cross bar for a particular bipod leg length and photo sequence. However, only the above formulae have been set forth as an illustration of a manner of utilizing the bipod camera support of the invention.

While the invention has been thus described, it is not intended that the invention be so limited since certain modifications may be made therein without departing from the scope of the invention. Accordingly, it is intended that all matter contained in the foregoing description or shown in the accompanying drawings shall be interpreted as illustrative and not in a limiting sense.

What is claimed is:

1. A camera support for terrestrial photogrammetry comprising a frame having a pair of longitudinally adjustable legs, said legs being pivotally joined to each other at one end thereof and spaced apart at the other end thereof, a pair of universal supports for mounting said frame, each said universal support mounting one of said legs at said other end, means for pivoting said frame about said pair of supports, and a longitudinally adjustable mounting means mounted between and secured at each end to said legs for supporting a camera bracket thereon.

2. A camera support for terrestrial photogrammetry comprising a frame having a pair of longitudinally adjustable legs, said legs being pivotally joined to each other at one end thereof and spaced apart at the other end thereof, a pair of universal supports for mounting said frame, each said universal support mounting one of said legs at said other end, means for pivoting said frame about said pair of supports, an adjustable mounting means mounted intermediately between and secured at each end to said legs, and a camera support bracket mounted on said adjustable tube for supporting a camera thereon.

3. A camera support for terrestrial photogrammetry comprising a frame having a pair of longitudinally adjustable legs, said legs being pivotally joined to each other at one end thereof and spaced apart at the other end thereof, a pair of universal supports for mounting said frame, each said universal support mounting one of said legs at said other end, means for pivoting said frame about said pair of supports, a longitudinally adjustable mounting means between and secured to said legs, a camera support bracket mounted on said adjustable mounting means for supporting a camera thereon, means connected to said camera support bracket for vertically moving said bracket in relation to said adjustable mounting means.

4. A camera support as set forth in claim 3 wherein said camera support bracket includes a pair of bracket legs having flanges at the upper end thereof, said flanges defining a right angle bend and seating on said adjustable mounting means, and a screw device at the lower end thereof for adjustably securing a camera thereto to align the balance axis of the camera and bracket with the optical axis of the camera.

5. A camera support as set forth in claim 3 wherein said camera support bracket comprises means for mounting a camera thereon, said mounting means having adjustable means therein for aligning the balance axis of the camera and bracket with the optical axis of the camera.

6. A camera support for terrestrial photogrammetry comprising a frame having a pair of longitudinally adjustable legs, said legs being pivotally joined to each other at one end thereof and spaced apart at the other end thereof, a pair of universal supports for mounting said frame, each said universal support mounting one of said legs at said other end, means for pivoting said frame about said pair of supports, an adjustable mounting means adjustably secured to and between said legs, a square-shaped tube having an upstanding flange thereon mounted on said adjustable mounting means, a camera support bracket mounted on said tube, said support bracket having a pair of flanged legs for complementary engagement with said tube astride said flange, and means connected to said camera support bracket for vertically moving said bracket with respect to said tube.

7. A camera support as set forth in claim 6 wherein said pivoting means includes a first bridle connected to one side of said frame for pulling on said frame and a second bridle connected to the opposite side of said frame for pulling against said first bridle.

8. A camera support as set forth in claim 6 wherein said means for vertically moving said bracket comprises a pulley having a cable secured to said bracket at one end, the other end extending to the base of the frame whereby said bracket can be raised to or lowered from said adjustable mounting means.

References Cited

UNITED STATES PATENTS

| | | | |
|---|---|---|---|
| 1,751,774 | 3/1930 | Trullinger | 88—24 |
| 2,224,143 | 12/1940 | Cornelius | 288—163 |
| 2,275,687 | 3/1942 | Schubert | 88—24 |
| 2,763,456 | 9/1956 | Breer | 248—186 |
| 3,017,817 | 1/1962 | Sampson | 95—86 |

JOHN M. HORAN, *Primary Examiner.*